(12) United States Patent
Kim et al.

(10) Patent No.: US 8,764,433 B2
(45) Date of Patent: Jul. 1, 2014

(54) MOLD APPARATUS

(75) Inventors: Jookwon Kim, Changwon-Si (KR);
Gyusang Lee, Changwon-Si (KR);
Minkyu Hwang, Changwon-Si (KR);
Hyunwoo Jun, Changwon-Si (KR);
Seokjae Jeong, Changwon-Si (KR);
Kyungdo Kim, Changwon-Si (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 13/480,962

(22) Filed: May 25, 2012

(65) Prior Publication Data

US 2012/0301571 A1    Nov. 29, 2012

(30) Foreign Application Priority Data

| May 25, 2011 | (KR) | 10-2011-0049699 |
| May 25, 2011 | (KR) | 10-2011-0049700 |
| Jun. 17, 2011 | (KR) | 10-2011-0059266 |
| Jun. 17, 2011 | (KR) | 10-2011-0059267 |
| Jun. 21, 2011 | (KR) | 10-2011-0060218 |

(51) Int. Cl.
*B29C 45/73* (2006.01)

(52) U.S. Cl.
USPC .......................... 425/547; 425/548; 425/552

(58) Field of Classification Search
USPC ................. 425/542, 547, 548, 552, 143
See application file for complete search history.

(56) References Cited

U.S. PATENT DOCUMENTS

| 7,740,473 B2 * | 6/2010 | Kang ............................. 425/548 |
| 7,963,760 B2 * | 6/2011 | Cho et al. ....................... 425/547 |
| 2001/0026817 A1 * | 10/2001 | Shida et al. ..................... 425/542 |
| 2007/0092595 A1 * | 4/2007 | Yoshino et al. ................. 425/547 |
| 2008/0054529 A1 * | 3/2008 | Kang ......................... 264/328.16 |
| 2008/0175946 A1 * | 7/2008 | Hwang et al. ................... 425/547 |
| 2009/0212464 A1 * | 8/2009 | Kang ......................... 264/328.14 |
| 2010/0159061 A1 * | 6/2010 | Chen et al. ...................... 425/547 |
| 2011/0204535 A1 * | 8/2011 | Inoue ............................ 264/40.6 |
| 2012/0286451 A1 * | 11/2012 | Toda et al. ................. 264/328.16 |

FOREIGN PATENT DOCUMENTS

| JP | 01-298032 A | 12/1989 |
| JP | 04-218630 A | 8/1992 |
| JP | 11-254447 A | 9/1999 |
| JP | 2006-150854 A | 6/2006 |
| WO | WO 2010-032925 A1 | 3/2010 |

OTHER PUBLICATIONS

Japanese Office Action dated Jun. 18, 2013 issued in Application No. 2012-120128.

* cited by examiner

*Primary Examiner* — Tim Heitbrink

(74) *Attorney, Agent, or Firm* — Ked & Associates, LLP

(57) ABSTRACT

The present disclosure relates to a mold apparatus, and according to an aspect of the present disclosure, there is provided a mold apparatus including a cavity mold comprising a cavity mold plate formed with a cavity at a front surface thereof and provided with a heating means at an inner portion thereof, and a cooling plate brought into contact with or separated from a rear surface of the cavity mold plate and provided with a cooling means at an inner portion thereof; and a core mold configured to determine the cavity together with the cavity mold plate, wherein the cooling plate is formed with at least two or more divided surfaces.

20 Claims, 14 Drawing Sheets

FIG. 15

| COOLING MEANS | COOLING PLATE | ON | | | | |
|---|---|---|---|---|---|---|
| | CAVITY MOLD PLATE & CORE MOLD | OFF | | | ON | |
| MOLD APPARATUS | | MOLD OPEN ▶ | PRODUCT OUT ▶ | MOLD CLOSE ▶ | INJECTION ▶ | COOLING |
| CONTROLLER | CAVITY MOLD PLATE | HEATER ON ▶ | SETTING TEMP ▶ | HEATER OFF | | |
| | CORE MOLD | HEATER ON ▶ | SETTING TEMP ▶ | HEATER OFF | | |

MOLD APPARATUS

CROSS-REFERENCE TO RELATED APPLICATIONS

This application claims the benefit of Korean Patent Application No. KR 10-2011-0049699 filed on May 25, 2011, KR 10-2011-0049700 filed on May 25, 2011, KR 10-2011-0059266 filed on Jun. 17, 2011, KR 10-2011-0059267 filed on Jun. 17, 2011, and KR 10-2011-0060218 filed on Jun. 21, 2011, which is hereby incorporated by reference for all purposes as if fully set forth herein.

BACKGROUND OF THE INVENTION

1. Field of the Invention

The present invention relates to an injection mold apparatus for manufacturing a resin injection molded article, and more particularly, to an injection mold apparatus having a heating means and a cooling means in the mold apparatus to heat or cool a mold during the injection process.

2. Description of the Related Art

Injection mold is a typical method of molding a synthetic resin such as plastic or the like. For such an injection mold, molten resin is injected and filled into a cavity of the mold formed in a certain shape and then cooled and hardened to mold a product having the same shape as the cavity.

In general, a surface of the injection molded product is roughly formed and thus an additional painting or surface treatment process is required, and accordingly, the process becomes complicated.

Consequently, in order to smoothen the molded surface and simplify the process, a cold mold in which injection molding is carried out and then only an outer portion of the mold is cooled down but an inner portion thereof is slowly cooled down has been developed. In this case, thermal strength can be enhanced, but the inner portion is in a low-temperature state at the initial stage even when a high-temperature mold compound is injected and thus it is difficult to maintain the temperature, thereby causing difficulty in smoothening the surface of the injection molded product.

Accordingly, molding technologies in which injection is carried out while maintaining the mold at a high temperature and then the mold is rapidly cooled down have been studied, and as a result a high-temperature mold technology has been developed. In the high-temperature mold technology, the temperature of the mold is maintained at a high temperature by a hot wire or the like embedded in the mold to perform injection and thus resin is uniformly filled into the cavity. Furthermore, rapid cooling is uniformly carried out through a coolant passage embedded in the mold. As a result, the surface of the molded article is uniformly formed to allow the formation of a smoothened appearance. Furthermore, an additional surface treatment process is not required, thereby allowing the simplification of the process through no-painting.

In such a high-temperature mold technology, the process of increasing the mold temperature and decreasing the mold temperature becomes a key factor for determining the surface state of the injection molded article. For the technology of decreasing the mold temperature, a cooling plate is provided at a rear surface of the cavity mold plate having a heating means, and the cooling plate is brought into contact with the cavity mold plate during the cooling process, thereby performing rapid cooling.

Here, the cooling plate should be uniformly brought into contact with the cavity mold plate to enhance the cooling efficiency and reduce the cooling temperature variation, thereby improving the surface state of the injection molded article. However, the cavity mold plate is rapidly cooled down in a high-temperature state, and therefore thermal expansion and deformation occurs in a mass production system requiring frequent use. As a result, the cavity mold plate and the cooling plate are not uniformly brought into contact with each other, thereby causing a problem of severe cooling temperature variation.

SUMMARY OF THE INVENTION

The present invention is contrived to solve the foregoing problems in the related art, and an object of the present disclosure is to provide a mold apparatus capable of uniformly cooling a surface of the mold.

Furthermore, another object of the present disclosure is to provide a mold apparatus capable of reducing the cooling temperature variation to decrease failure rate and ensure uniform quality.

In addition, still another object of the present disclosure is to provide a mold apparatus capable of enhancing the cooling speed and cooling efficiency to enhance the productivity.

According to an aspect of the present invention, there is provided a mold apparatus including a cavity mold comprising a cavity mold plate formed with a cavity at a front surface thereof and provided with a heating means at an inner portion thereof, and a cooling plate brought into contact with or separated from a rear surface of the cavity mold plate and provided with a cooling means at an inner portion thereof; and a core mold configured to determine the cavity together with the cavity mold plate, wherein the cooling plate is formed with two or more divided surfaces.

According to another aspect of the present invention, there is provided a mold apparatus including a cavity mold comprising a cavity mold plate formed with a cavity at a front surface thereof and provided with a heating means at an inner portion thereof, a base configured to support the cavity mold plate, and a cooling plate fixed between the cavity mold plate and the base to be brought into contact with or separated from the cavity mold plate and provided with a first cooling means at an inner portion thereof; a core mold provided with a core mold plate for determining the cavity together with the cavity mold plate, and including a heating means and a second cooling means disposed in the core mold plate; and a controller configured to control the operation of the heating means and cooling means, wherein the cavity mold plate includes a third cooling means.

According to the foregoing aspects of the present invention, a cooling plate of the mold is divided and each of the divided surfaces of the cooling plate is closely adhered to a rear surface of the cavity mold plate. Accordingly, a cooling temperature variation of the mold can be reduced to decrease failure rate and ensure uniform quality.

Furthermore, according to another aspect of the present invention, a contact pressure is provided such that a cooling plate can be more uniformly adhered to the mold to reduce a cooling temperature variation of the mold and improve the cooling speed and efficiency, thereby enhancing the productivity.

In addition, according to still another aspect of the present invention, a cooling temperature variation of the mold can be compensated in consideration of structural features of the cavity. Accordingly, it may be possible to achieve a uniform cooling temperature distribution of the mold.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 15 is a flow chart schematically illustrating an operational sequence in the third embodiment;

DETAILED DESCRIPTION OF THE INVENTION

Hereinafter, the detailed description of implementing the present invention will be described through an embodiment of the present invention with reference to the accompanying drawings.

Figure 1:
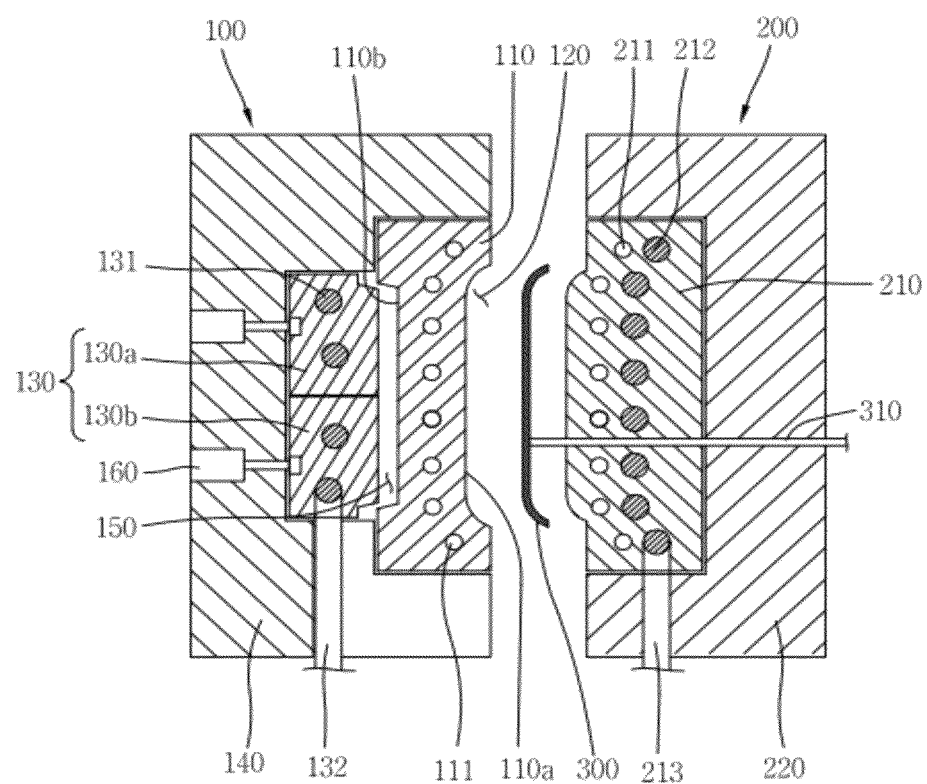
FIG. 1 is a side cross-sectional view illustrating a mold apparatus according to a first embodiment of the present invention.
Figure 2:
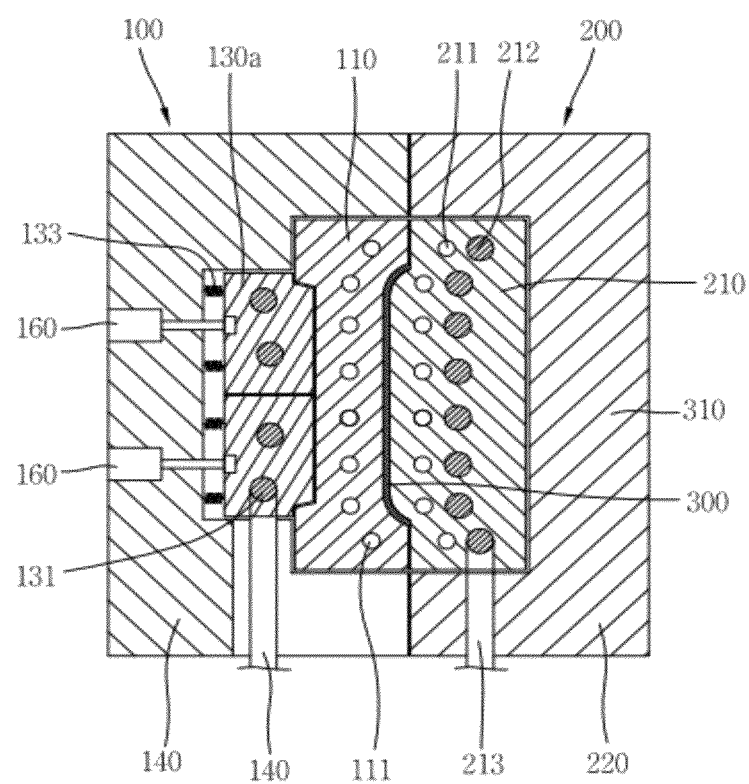
FIG. 2 is a side cross-sectional view illustrating a combined state of the mold apparatus in FIG. 1.

FIG. 1 is a side cross-sectional view illustrating a mold apparatus according to a first embodiment of the present invention, and FIG. 2 is a side cross-sectional view illustrating a combined state of the mold apparatus in FIG. 1.

Referring to FIGS. 1 and 2, a mold apparatus according to the first embodiment includes a cavity mold 100, and a core mold 200 combined with a front surface of the cavity mold plate.

The cavity mold 100 is a fixed mold, including a cavity mold comprising a cavity mold plate 110 formed with a cavity 120 at a front surface 110a thereof and provided with a heating means 111 at an inner portion thereof, and a cooling plate 130 brought into contact with or separated from a rear surface 110b of the cavity mold plate and provided with a cooling means 131 at an inner portion thereof. Furthermore, the cavity mold 100 may include a base 140 at which the cavity mold plate is placed, an accommodation space 150 between the cavity mold plate and the base to movably accommodate the cooling plate, and a cooling plate transfer means 160 configured to transfer the cooling plate such that the cooling plate is brought into contact with or separated from the cavity mold plate in the accommodation space.

The cavity mold plate 110 is detachably supported and fixed to the base 140 fixed and supported by the ground or support structure (not shown) as illustrated in FIG. 1.

The cavity mold plate 110 is engaged with a core mold plate 210 of the core mold 200 which will be described later to form a space of the cavity 120 capable of forming an injection molded article 300, and to this end, provided with a concaved portion for forming part of the cavity 120 at a front surface 110a of the cavity mold plate 110.

The cavity mold plate 110 may include a heating means 111 for maintaining the temperature of the mold at a high temperature to perform molding. As illustrated in FIG. 1, the heating means 111 is embedded in a groove formed at an inner portion of the cavity mold plate, and an electric heater is typically used therefore. The heating means 111 is separated from a front surface 110a of the cavity mold plate 110 by a predetermined distance and thus unexposed on the front surface. Furthermore, a plurality of grooves in which the heating means is embedded are formed to be separated from one another along a front surface of the cavity mold plate. Accordingly, the heating means can uniformly transfer heat along the cavity in which the injection molded article is placed.

The cooling plate 130 is provided at a rear surface 110b of the cavity mold plate, and provided to be moved within the accommodation space 150 formed between the cavity mold plate 110 and base 140. In other words, as illustrated in FIG. 2, when the cavity mold 100 and core mold 200 are combined with each other, the cooling plate 130 can be moved to be brought into contact with a rear surface 110b of the cavity mold plate. The movement of the cooling plate is enabled by the cooling plate transfer means 160 provided at the base to be combined with a rear surface of the cooling plate. The cooling plate transfer means 160 may be configured with a hydraulic or pneumatic device.

The cooling plate 130 includes a first cooling means 131 disposed therein. The first cooling means 131 is provided with a cooling passage through which coolant flows formed at an inner portion of the cooling plate. The coolant is supplied to the coolant passage through a coolant supply pipe 132 connected to an outside of the cavity mold. The coolant passage is uniformly formed along the coolant passage to uniformly provide a cooling effect of the cavity mold plate by means of the cooling plate.

Figure 3:
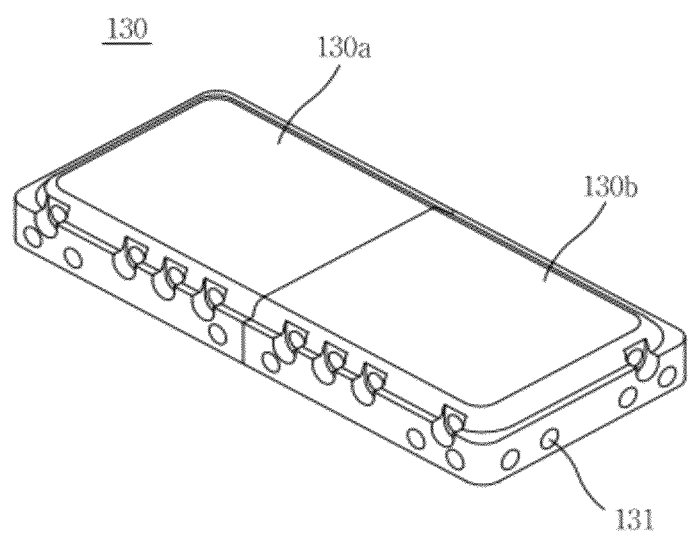
FIG. 3 is a perspective view illustrating a modified example of the first embodiment.
Figure 4:
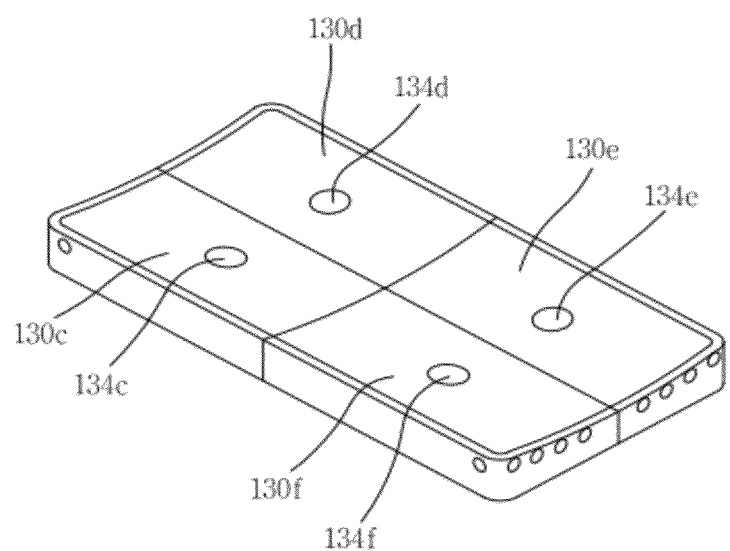
FIG. 4 is a perspective view illustrating another modified example of the first embodiment.

Meanwhile, the cooling plate 130 may be formed with at least two or more divided surfaces 130a, 130b. FIG. 3 illustrates an embodiment in which the cooling plate is divided into two surfaces, and FIG. 4 illustrates an embodiment in which the cooling plate is divided into four surfaces. However, the cooling plate in a mold apparatus according to the present invention is not limited to this, and all embodiments in which the cooling plate is divided into at least two or more surfaces are within the scope of the invention.

Referring to FIG. 3, the cooling plate 130 is divided into two separate surfaces 130a, 130b. The first cooling means 131 is provided at each divided surface, and the cooling plate transfer means 160 connected to the each divided surface is provided at a rear surface thereof. The cooling plate transfer means 160 is provided at the each divided surface, and connected to a central portion of the each divided surface.

Referring to FIG. 4, the cooling plate 130 is divided into four separate surfaces 130c, 130d, 130e, 130f. Each of the four separate surfaces is also provided with a cooling means, and the cooling plate transfer means 160 is connected to a rear surface thereof. FIG. 4 illustrates a rear surface of the cooling plate 130. In FIG. 4, the cooling plate 130 is formed with combining holes 134c, 134d, 134e, 134f, respectively, connected to the cooling plate transfer means 160 connected to each divided surface.

Referring to FIGS. 3 and 4, the divided surfaces are separated from one another. Accordingly, the operation of the cooling plate transfer means connected to each divided surface may be exhibited in a different manner. In other words, a height of the each divided surface being brought into contact with the cavity mold plate may be formed in a different manner by the cooling plate transfer means.

According to an aspect of the foregoing configuration, the cooling plate 130 is divided in accordance with a rear surface of the cavity mold plate 110 such that each divided surface of the cooling plate is closely adhered to a rear surface of the cavity mold plate. Accordingly, it may be possible to reduce the cooling temperature variation, thereby decreasing failure rate and securing uniform quality.

On the other hand, the divides surfaces 130a, 130b, 130c, 130d, 130e, 130f may include a plurality of elastic bodies 133 mounted between the base 140 and the surfaces. FIG. 2 illustrates a position at which the elastic body is mounted, and specifically, FIG. 5 illustrates a state in which the elastic body 133 is mounted on the cooling plate 130.

Figure 5:
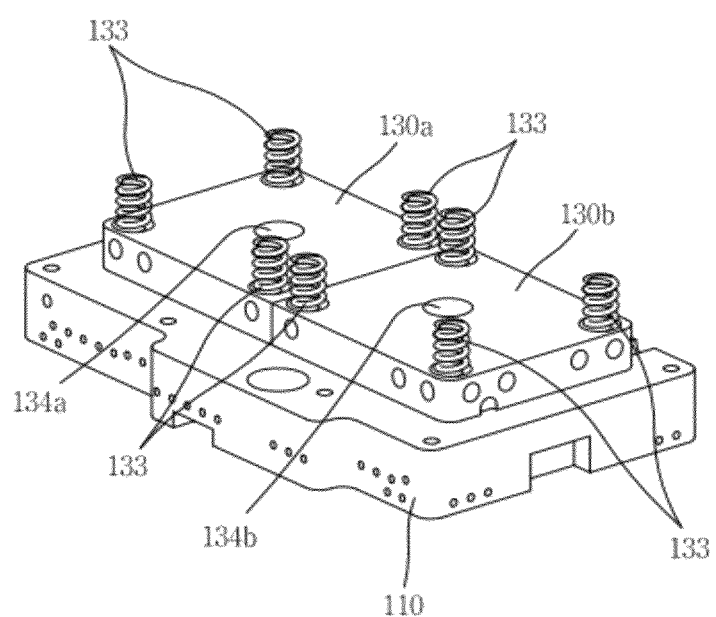
FIG. 5 is a perspective view illustrating that an elastic body is provided at a rear surface of the cooling plate in a mold apparatus according to the present invention.

Referring to FIG. 5, the elastic bodies 133 are formed with coil springs, respectively, and mounted at a rear surface of the cooling plate 130. Here, the elastic bodies 133 are symmetrically mounted at each corner of the divided surfaces, respectively, around the combining holes 134a, 134b through which the cooling plate transfer means 160 is connected to the cooling plate on the each divided surfaces 130a, 130b.

According to an aspect of the foregoing configuration, the each divided surface is closely adhered to a rear surface of the cavity mold plate by the cooling plate transfer means, and the elastic body forms a contact pressure, thereby allowing the divided surface to be more uniformly brought into contact therewith.

Meanwhile, the cooling plate 130 may be selectively combined with the divided surfaces with different materials. In other words, in FIG. 3, the first divided surface 130a and second divided surface 130b can be provided with different materials on the two divided surfaces.

According to an aspect of the foregoing configuration, the divided surfaces having different thermal conductivities are combined with one another to compensate the cooling temperature variation by considering that local cooling temperature variations are generated on the cavity mold plate due to a structural feature of the cavity 120. Accordingly, it may be possible to achieve more uniform cooling temperature distribution.

On the other hand, the core mold 200 may be provided in a movable manner to be combined with a front surface of the cavity mold plate 100. Though not shown in the drawing, a transfer means (not shown) may be connected to the base 220 of the core mold 200 so as to be moved toward the cavity mold plate 100, and a guide member (not shown) or the like may be also provided thereon.

The core mold 200 is provided with the core mold plate 210 forming the cavity 120 in accordance with the cavity mold plate, and the core mold plate is provided with additional heating means 211 and cooling means 212 disposed therein other than the cavity mold plate 100, and provided with a coolant supply pipe 213. The detailed description of the heating means, cooling means, and the like, in the core mold plate 210 will be omitted when the description of the cavity mold plate is redundant.

A mold compound injection pipe 310 passing through the mold is provided at the core mold 200. The injection mold compound 300 injected by the mold compound injection pipe is schematically illustrated in FIG. 1.

On the other hand, injection molding by the cavity mold 100 and core mold 200 is carried out as follows. The heating means 111, 211 of the cavity mold plate and core mold plate are operated in a state that the cooling plate 130 is separated from the cavity mold plate 110 as illustrated in FIG. 1 to heat the mold plates, thereby maintaining a high-temperature state. In this case, as illustrated in FIG. 2, the cavity mold and core mold are combined with each other, and thus the cavity mold plate 110 and core mold plate 210 form the cavity 120.

The injection mold compound 300 is injected and filled in the heated cavity 120 in a high-temperature state. In a state that the injection mold compound is filled therein as illustrated in FIG. 2, the cooling plate transfer means 160 is operated and the cooling plate 130 is brought into contact with a rear surface of the cavity mold plate 110. Furthermore, the first cooling means 131 of the cooling plate and the second cooling means 212 of the core mold plate are operated to perform cooling.

Figure 6:
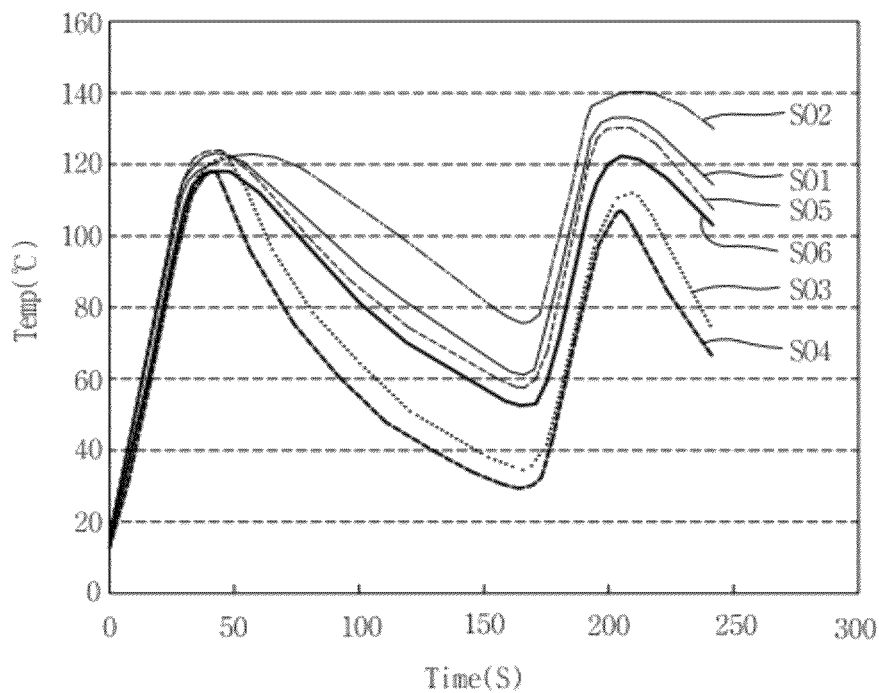
FIG. 6 is a graph illustrating temperature distribution based on the location of the mold in a mold apparatus in the related art.
Figure 7:
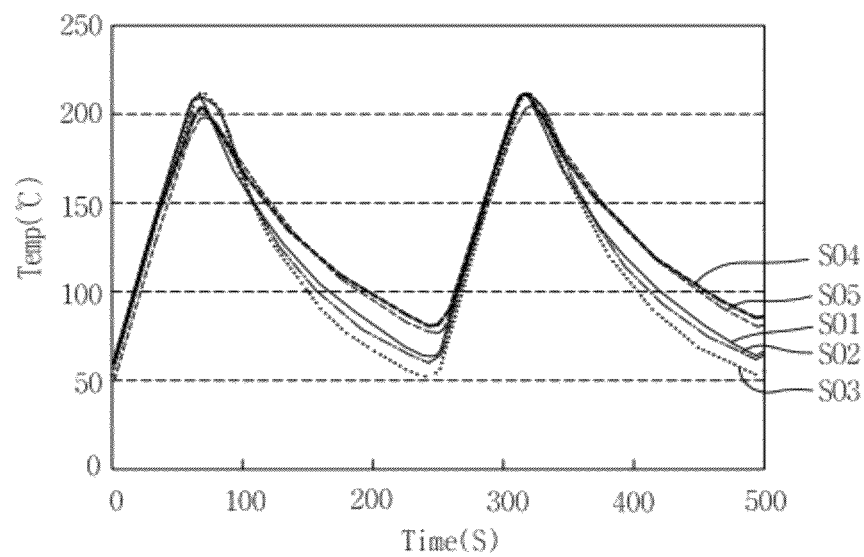
FIG. 7 is a graph illustrating temperature distribution based on the location of the mold in a mold apparatus according to the present invention.

FIGS. 6 and 7 illustrate temperature distribution at various points of the mold in a state that the divided cooling plate 130 is not provided therein and in a state that the divided cooling plate 130 is provided therein, respectively. The temperature distribution graph can be obtained by embedding thermocouples in various different positions of the cavity mold plate.

In FIG. 6, it is seen that temperatures are distributed in a broad range based on time at various positions of the mold in a state that the divided cooling plate 130 is not provided therein. On the contrary, in FIG. 7, it is seen that temperatures based on time at various positions of the mold are distributed in a narrow range in a state that the divided cooling plate 130 is provided therein.

Since the temperature at a specific position of the mold is excessively high in the state of FIG. 6, the temperature that can be raised during the entire molding process is restrictive. However, the entire temperature distribution of the mold is narrowly formed in the state of FIG. 7 and thus the temperature of the mold can be sufficiently raised. Accordingly, since the injection is carried out in a high-temperature state, a failure rate of the injection molded articles can be reduced, thereby securing uniform quality.

Furthermore, in the state of FIG. 6, an idle time may be required to prevent the entire temperature distribution of the mold from being increased in the middle of the repetitive mass production process. However, in the state of FIG. 7, temperature distribution is not large, and thus an unnecessary idle time can be reduced, thereby enhancing work efficiency or productivity.

Figure 8:
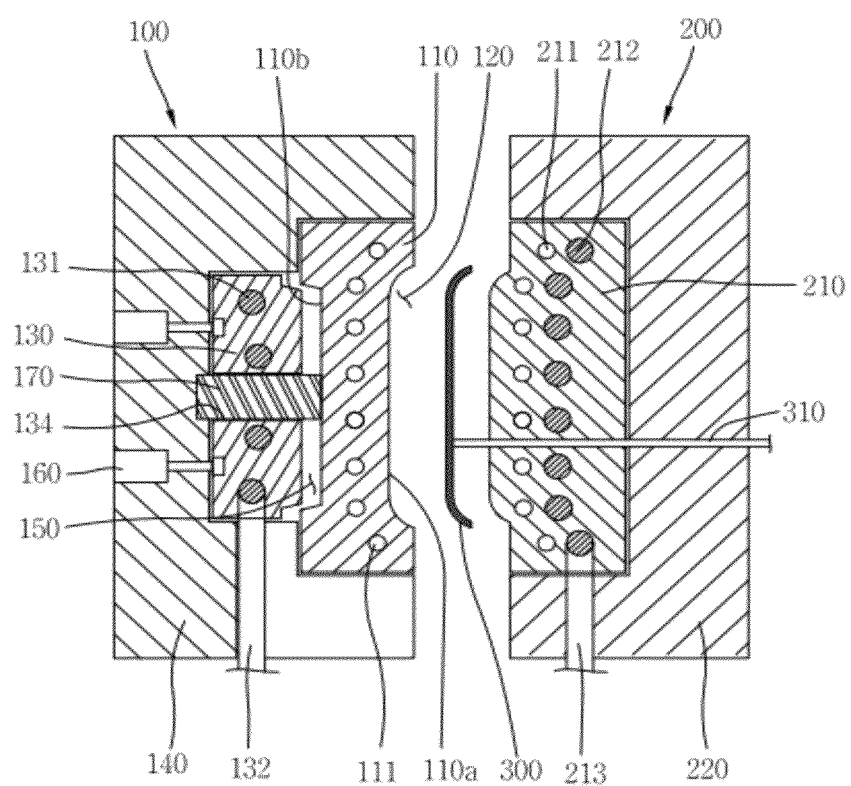
FIG. 8 is a side cross-sectional view illustrating a mold apparatus according to a second embodiment of the present invention.
Figure 9:
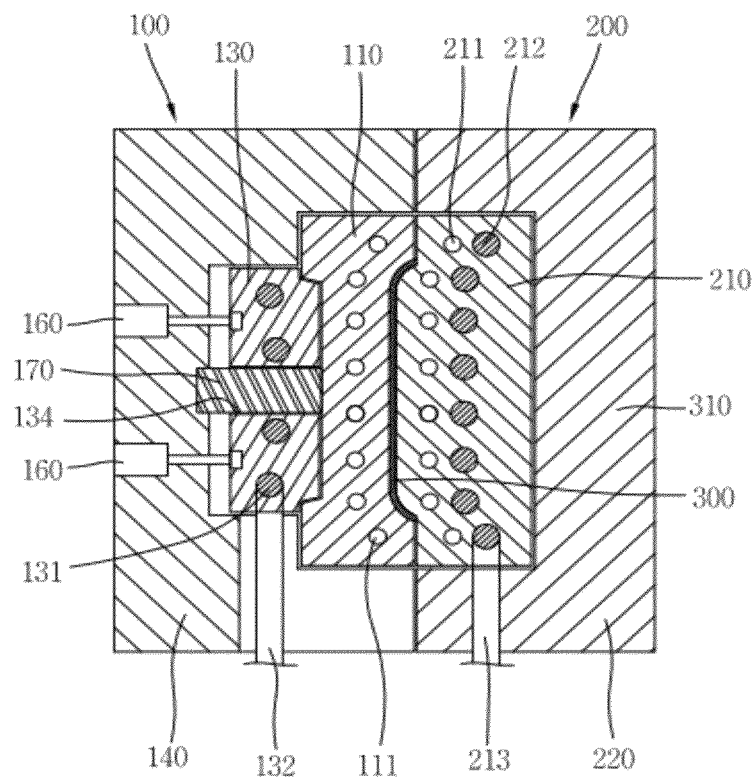
FIG. 9 is a side cross-sectional view illustrating a combined state of the mold apparatus in the second embodiment.

FIGS. 8 and 9 are views illustrating a mold apparatus according to a second embodiment of the present invention. Hereinafter, the second embodiment will be described with reference to FIGS. 8 and 9, and the same elements are designated with the same numeral references and their redundant description will be omitted.

Referring to FIGS. 8 and 9, the second embodiment may further include a support member 170 a lateral surface of which is combined with the base and the other lateral surface of which is combined with a rear surface of the cavity mold plate within the accommodation space 150 of the first embodiment.

The support member 170 supports the cavity mold plate 110 in a pillar shaped configuration, and has a substantially cylindrical shape.

The support member 170 passes through the cooling plate 130 to be mounted within the accommodation space 150. In other words, a lateral surface of the support member 170 is combined with the base 140 within the accommodation space 150 and the other lateral surface thereof is combined with a rear surface 110b of the cavity mold plate.

Figure 10:
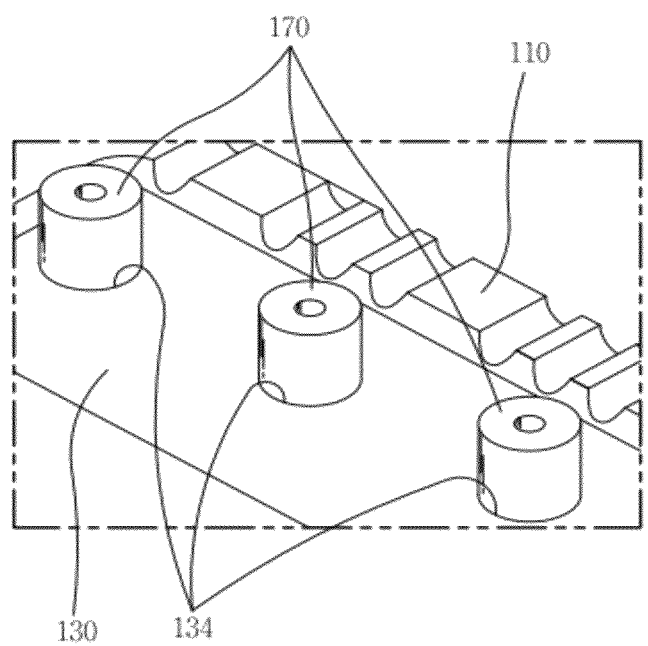
FIG. 10 is an enlarged perspective view illustrating part of the second embodiment.

Referring to FIG. 10, the cooling plate 130 is provided with a through hole 134 through which the support member passes. Accordingly, the support member passes through the through hole 134 to support the cavity mold plate 110 against the base 140. Through this, a rear surface of the cavity mold plate having a low thickness is supported by a pillar shaped support member, thereby supporting the cavity mold plate against a pressure applied through a front surface of the cavity mold plate. Accordingly, it may be possible to effectively increase structural strength even if the thickness of the cavity mold plate is not high.

On the other hand, the movement of the cooling plate 130 within the accommodation space is guided by the support member. In other words, as described above, the cooling plate 130 is moved by the cooling plate transfer means 160 within the accommodation space 150, and the support member 170 may also perform the role of guiding the movement of the cooling plate.

Figure 11:
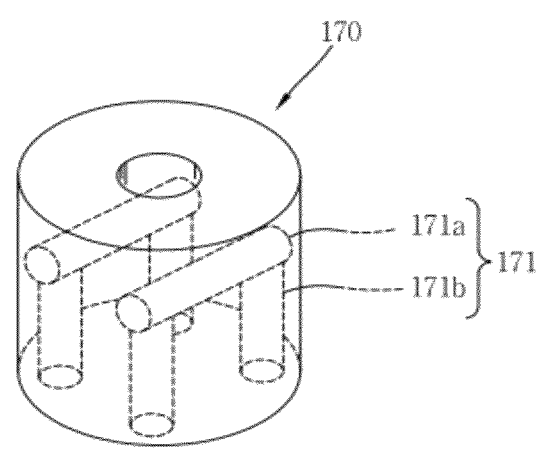
FIG. 11 is a perspective view illustrating a support member according to a modified example of the second embodiment.
Figure 12:
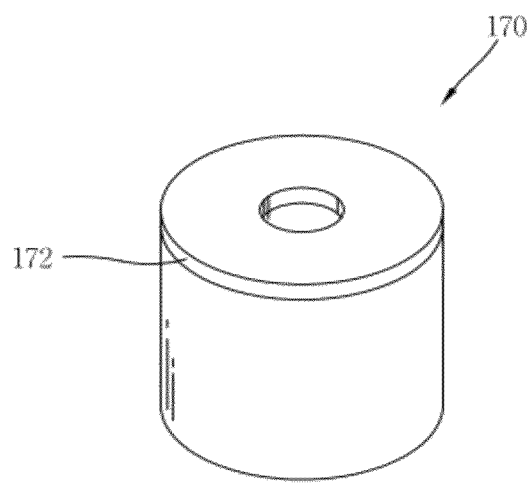
FIG. 12 is a perspective view illustrating a support member according to another modified example of the second embodiment.

FIGS. 11 and 12 are views illustrating the support member according to modified examples. Referring to FIG. 11, the support member 170 according to an embodiment may include the coolant passage 171 formed therein. The coolant passage 171 may include at least one parallel passages 171a in parallel to but separated from the cavity mold plate and a connecting passage 171b for supplying and collecting coolant to and from the parallel passage. Accordingly, coolant supplied through the connecting passage flows through the parallel passage to be brought into contact with the rear surface 110b of the cavity mold plate brought into contact with the support member to exchange heat, thereby cooling the cavity mold plate.

Referring to FIG. 12, an insulating plate 172 may be provided at a portion brought into contact with the rear surface 110b of the cavity mold plate. The insulating plate 172 prevents the heat of the heated cavity mold plate in a high-temperature state from being transferred to the base 140 through the support member 170 without being heat exchanged through the cooling plate 130. Furthermore, deformation or damage due to the support member may be prevented.

Meanwhile, a plurality of support members 170 may be provided therein. Referring to FIG. 10, a plurality of support member 170 pass through a plurality of through holes to be combined with the cooling plate 130. Here, a plurality of through holes 133 corresponding to the number of support members are provided therein.

Preferably, the support member may be formed of a stainless steel (STS) material. Since the stainless steel has low thermal conductivity and excellent strength, the deformation or damage of the support member due to the heat of the cavity mold plate brought into contact with the support member can be reduced.

Figure 13:
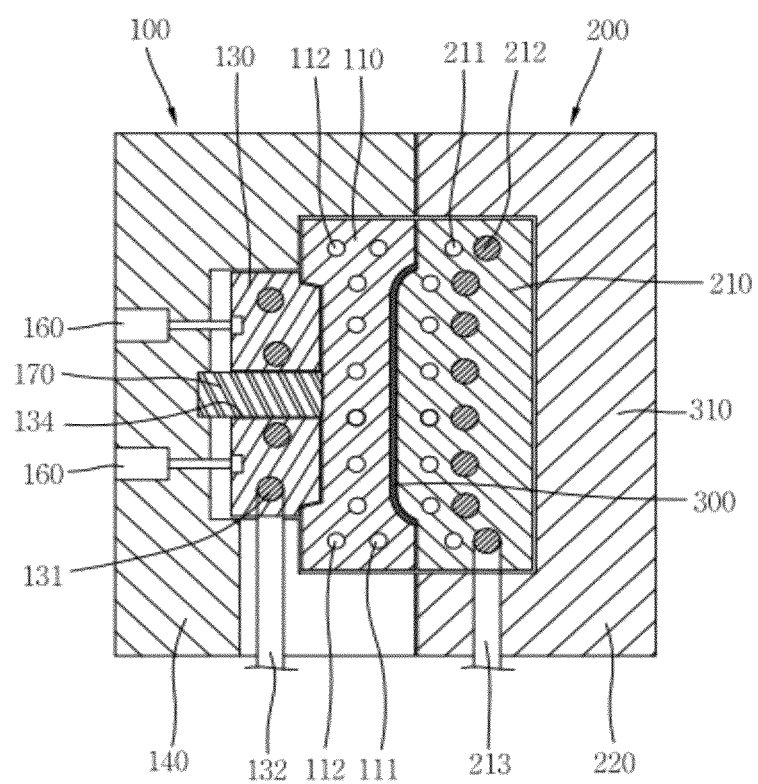
FIG. 13 is a side cross-sectional view illustrating a mold apparatus according to a third embodiment of the present invention.
Figure 14:
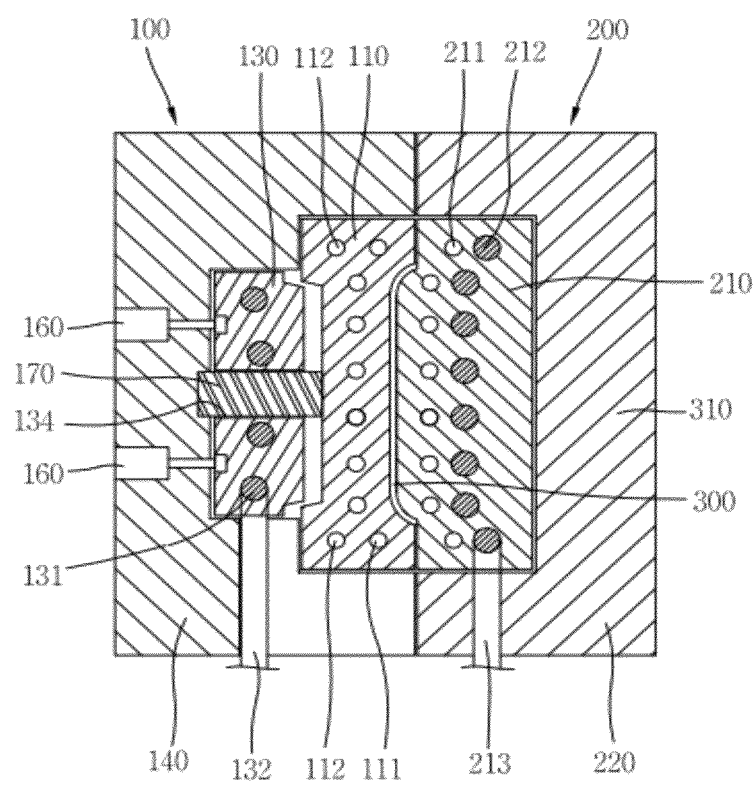
FIG. 14 is a side cross-sectional view illustrating a state prior to injecting resin into an inner portion of the cavity in the third embodiment.

FIGS. 13 and 14 are cross-sectional views illustrating a mold apparatus according to a third embodiment of the present invention. The third embodiment has a difference in which a third cooling means is added to the cavity mold plate of the first embodiment. In other words, a third cooling means 112 in which coolant flows is added adjacent to both sides of the cavity mold plate 110, thereby further enhancing the cooling speed of the cavity mold plate 110 together with the first cooling means 131.

Referring to FIGS. 13 through 15, the operation of the third embodiment will be described. FIG. 13 is a view illustrating a state that a resin composition is injected into an inner portion of the cavity formed with the core mold plate and cavity mold plate engaged with each other and then the resin composition is cooled by the cooling plate. FIG. 14 is a side cross-sectional view illustrating a state prior to injecting a resin composition into an inner portion of the cavity in the third embodiment.

The controller configured to control the operation of the foregoing embodiment repeatedly implements an injection process. Referring to FIG. 15, the process of opening the core mold plate and cavity mold plate to discharge a finished product that has been injected in the prior step, and then closing the core mold plate and cavity mold plate again to form a cavity, and then injecting and cooling a resin composition and then opening the core mold plate and cavity mold plate will be repeated.

At this time, a heater provided at the core mold plate and cavity mold plate is operated immediately after opening the core mold plate and cavity mold plate to start the heating of the core mold plate and cavity mold plate. In this manner, the heating of the core mold plate and cavity mold plate is carried out immediately after opening the mold to reduce a time required for heating. Then, when the core mold plate and cavity mold plate are heated to a temperature suitable for injection an optimal temperature is maintained, and when the operation of injecting a resin composition is completed the operation of the heater is suspended to perform the cooling process.

Here, the resin composition injected through heating the core mold plate and cavity mold plate can be uniformly distributed within the cavity. During this process, the cooling plate 130 maintains a state of being separated from the cavity mold plate 110 as illustrated in FIG. 14, but coolant is supplied to an inner portion of the first cooling means 131 provided at the cooling plate 130. In order to rapidly heat the cavity mold plate, coolant is preferably supplied subsequent to injecting a resin composition, but due to this the cooling of the cavity mold plate is delayed.

Accordingly, coolant should be continuously supplied to the cooling plate should to always maintain a cooled state, but also be in a state of being separated from the cavity mold plate 110 as illustrated in the drawing, and thus the heating of the cavity mold plate 110 is not delayed. At this time, coolant is not supplied to the second and the third cooling means 212, 112. When the cooling process is carried out, the cooling plate advances to the cavity mold plate as described above to indirectly cool the cavity mold plate as well as coolant is also supplied to the second and the third cooling means formed on the core mold plate and cavity mold plate, respectively, to initiate cooling. However, a time point at which coolant is supplied to the second and the third cooling means is located within the process of implementing the injection of the resin composition. In other words, a time required to inject a resin composition is relatively short whereas a time required to cool the core mold plate and cavity mold plate by supplying coolant is relatively long, and thus a time required for cooling can be reduced when coolant is started to be supplied while the resin composition is supplied.

Moreover, coolant is directly supplied to the cavity mold plate and core mold plate while the cavity mold plate is indirectly cooled by the cooling plate, thereby allowing rapid cooling and obtaining uniform temperature distribution. Furthermore, a relatively small number of coolant passages are disposed at the cavity mold plate disposed with the cooling plate, thereby preventing the structure of the mold from being excessively complicated, and minimizing the reduction of the mold strength due to a plurality of coolant passages.

On the other hand, according to the first through the third embodiments, the cavity mold plate may be formed of any known mold steel, but may be preferably formed of a material containing a weight ratio of Be: 1.9% and Co+Ni: 0.25% on a copper substrate. The material is known as a so-called HH (Moldmax HH), and has the following physical properties.

Hardness: 40 HRC
Tensile strength: 1175 MPa
Thermal conductivity (20° C.): 105 W/m·K Though the thermal conductivity has a value 5 times greater than that of the mold steel known as CENA-1 in the related art, tempering treatment is carried out to obtain higher thermal conductivity. The tempering treatment is carried out by forming the cavity mold plate and then heating at temperatures of 400-500° C. and then slowly cooling down to a room temperature in the furnace. When the tempering treatment is carried out, the hardness and tensile strength is maintained at the substantially same level, but the thermal conductivity is increased to 120 W/m·K, thereby reducing a time required for heating and cooling as well as having uniform temperature distribution even in the cavity mold plate.

Figure 16:
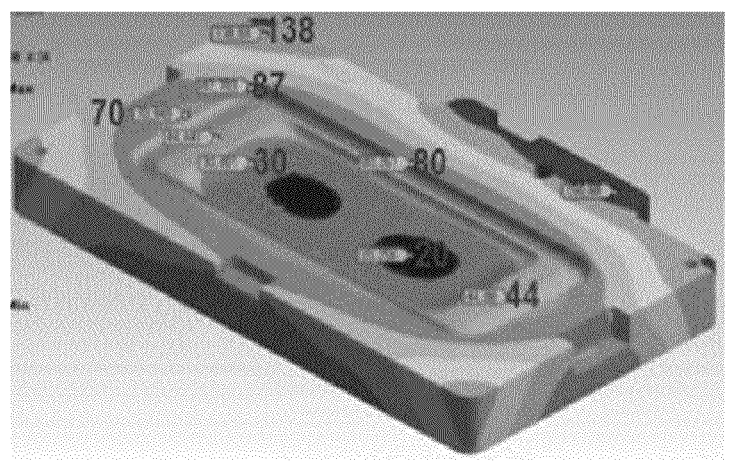
FIG. 16 is a perspective view illustrating temperature distribution in the cavity mold plate with a CENA-1 material.

FIG. 16 is a view illustrating temperature distribution in a state that CENA-1 in the related art having a thermal conductivity of 20 W/m·K is heated and then cooled down until the maximum temperature of the cavity mold plate becomes 80° C. As a result of the measurement, it is seen that a time required until the temperature of an external circumferential portion of the cavity mold plate becomes 80° C. is approximately 180 seconds, and temperature distribution is in a range from the minimum of 20° C. to the maximum of 80° C. It is similar to that observed during the heating process, and highly likely that the surface quality of an injection molded article is non-uniform since the temperature difference is relatively high over the entire cavity mold plate.

Figure 17:
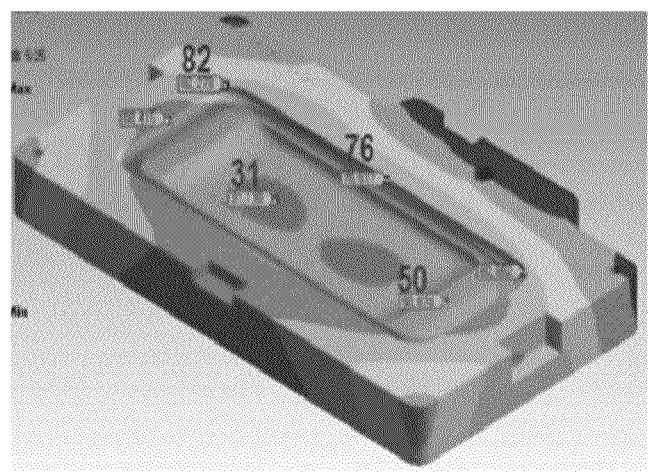
FIG. 17 is a perspective view illustrating temperature distribution in the cavity mold plate with a Moldmax HH material.

FIG. 17 is a view illustrating temperature distribution in the cavity mold plate tempered with the Moldmax HH, in which temperature distribution is similarly shown in a state of being cooled down until the maximum temperature of the cavity mold plate becomes 80° C. As a result of the measurement, a time required until the temperature of an external circumferential portion of the cavity mold plate becomes 80° C. is approximately 90 seconds, and therefore, about a half of that time is consumed compared to the CENA-1, and temperature distribution in a range from the minimum of 31° C. to the maximum of 76° C. is shown even in an inner portion of the cavity mold plate, and thus it is seen that temperature variation at each point is reduced compared to the CENA-1.

Accordingly, when the tempered Moldmax HH is used, a time required for cooling and heating can be reduced to a half compared to the CENA-1, but also the internal temperature of the cavity mold plate is more uniform during the heating and cooling process, thereby obtaining an effect that the surface quality of the injection molded article is uniform.

Here, a CrN coating layer may be formed on a surface brought into contact with the injection molded article in the mold apparatuses. The CrN coating layer prevents the core mold plate and cavity mold plate from being directly brought into contact with the injection molded article, thereby preventing the injection molded article from being stuck to an inner portion of the cavity. Moreover, it may be possible to minimize the damage of the core mold plate and cavity mold plate due to corrosive gases generated in a. high temperature environment.

In particular, according to an embodiment of the present invention, an injection process is carried out in a high-temperature environment to further smoothen a surface of the injection molded article, but as described above the thermal conductivity of the core mold plate and cavity mold plate should be high to improve workability and enhance process speed. To this end, when a beryllium-based copper alloy such as the Moldmax HH, or the like, is used, it is disadvantageous compared to a steel material such as CENA-1 in the aspect of stickability.

However, when a CrN coating layer is formed on the surface, it may be possible to improve stickability while maintaining a high thermal conductivity characteristic.

Here, the CrN (chromium nitride) coating exhibits a silver gray color, and has excellent abrasion resistance, stick resistance, thermal resistance and lubricity properties while solving the environmental problem of Cr plating. Tin coating has similar properties, but it is suitable to a case where the basic material is a high hardness material such as carbide, high speed tool steel, dies steel, and stainless steel, but unsuitable to a case where the basic material is relatively soft compared to the foregoing steel materials, for example, beryllium-based copper alloy.

Figure 18:
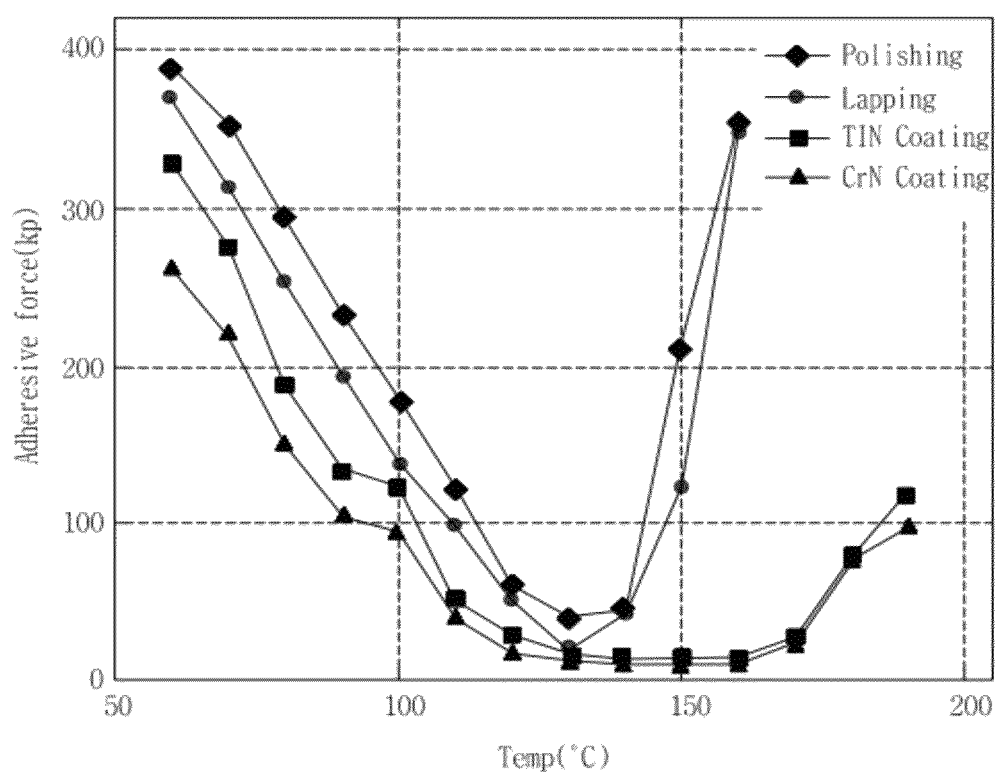
FIG. 18 is a graph illustrating a change of adhesive force according to the surface treatment process.

FIG. 18 is a graph illustrating a change of adhesive force when various surface treatment are carried out on a surface of the mold. Referring to FIG. 18, it is seen that the surface with a CrN coating layer has an adhesive force lower than that with a TiN coating layer over the entire region between 50 and 200° C. Accordingly, as illustrated in the above embodiment, it is seen that the CrN coating layer has the utmost performance in high-temperature injection mold having a Moldmax-based basic material.

The CrN coating may be formed using a physical vapor disposition (hereinafter, referred to as PVD) process. In addition to the PVD process, a chemical vapor deposition (hereinafter, referred to as CVD) process may be also used, but the PVD process is advantageous than the CVD process in obtaining a uniform and high-performance thin layer. In other words, the PVD process activates a metal material evaporated by an arc, heat, electron beam or the like in a high vacuum plasma environment, and then collides it to a target material with an acceleration energy from several tens to several thousand of eV to form a coating layer with a high hardness and high adhesiveness, and thus has features suitable to the formation of a coating layer in the mold repeatedly used for a long period of time as in the present invention. In particular, the PDV process has a low treatment temperature, typically less than 500° C., and high chemical stability, thereby providing an advantage of nearly non-corrosiveness.

What is claimed is:

1. A mold apparatus, comprising:
   a cavity mold comprising a cavity mold plate formed with a cavity at a front surface thereof and provided with a heater at an inner portion thereof, and a cooling plate movably installed in the cavity mold so as to be brought into contact with or separated from a rear surface of the cavity mold plate and provided with a cooler at an inner portion thereof; and
   a core mold configured to determine the cavity together with the cavity mold plate,
   wherein at least two or more cooling plates are provided in the cavity mold.

2. The mold apparatus of claim 1, wherein the cavity mold further comprises:
   a base at which the cavity mold plate is placed; and
   a cooling plate transferer configured to transfer the cooling plate such that the cooling plate is brought into contact with or separated from the cavity mold plate between the cavity mold plate and the base.

3. The mold apparatus of claim 2, wherein the cooling plate transferer is provided for the each cooling plate.

4. The mold apparatus of claim 3, further comprising:
   elastic bodies mounted between each cooling plate and the base.

5. The mold apparatus of claim 4, wherein the each cooling plate has a substantially rectangular shape, and the elastic body is disposed adjacent to each vertex of the cooling plate.

6. The mold apparatus of claim 1, wherein the each cooling plate is formed of different materials from one another.

7. The mold apparatus of claim 1, wherein the cooler comprises a coolant passage formed at an inner portion of the cooling plate.

8. The mold apparatus of claim 2, further comprising:
   a support member, a lateral surface of which is combined with the base, and an other lateral surface of which is combined with a rear surface of the cavity mold plate.

9. The mold apparatus of claim 8, wherein the cooling plate comprises a through hole through which the support member passes, and
   the support member is disposed in a state of being inserted in the through hole.

10. The mold apparatus of claim 8, wherein the support member is provided with an insulating plate at a portion combined with the cavity mold plate.

11. The mold apparatus of claim 8, wherein a coolant passage is formed at an inner portion of the support member.

12. The mold apparatus of claim 11, wherein the coolant passage forms a plurality of passages independent from one another.

13. The mold apparatus of claim 1, wherein the cavity mold plate contains a weight ratio of Be: 1.9% and Co +Ni: 0.25%, and is formed of a tempered beryllium-based copper alloy.

14. The mold apparatus of claim 13, wherein the tempering treatment is carried out by heating the cavity mold plate at temperatures of 400-500° C. and then cooling down in the furnace.

15. The mold apparatus of claim 1, wherein a CrN coating layer is formed on at least one surface of the cavity mold plate or core mold.

16. The mold apparatus of claim 15, wherein the cavity mold plate contains a weight ratio of Be: 1.9%, Co +Ni: 0.25% and is formed of a tempered beryllium-based copper alloy.

17. A mold apparatus, comprising:
   a cavity mold comprising a cavity mold plate formed with a cavity at a front surface thereof and provided with a heater at an inner portion thereof, a base configured to support the cavity mold plate, and a cooling plate movably installed between the cavity mold plate and the base so as to be brought into contact with or separated from the cavity mold plate and provided with a first cooler at an inner portion thereof;
   a core mold provided with a core mold plate for determining the cavity together with the cavity mold plate, and comprising a heater and a second cooler disposed in the core mold plate; and
   a controller configured to control the operation of the heaters and coolers,
   wherein the cavity mold plate comprises a third cooler.

18. The mold apparatus of claim 17, wherein the heaters of the core mold plate is disposed between a surface of the core mold plate and the second cooler.

19. The mold apparatus of claim 17, wherein a cooling capacity of the third cooler is less than that of the first cooling means.

20. The mold apparatus of claim 17, wherein the second and the third coolers are operated before the cooling plate is brought into contact with the cavity mold plate.

* * * * *